3,144,379
PROCESS OF PRECIPITATING CHLOROPRENE POLYMER LATEX ONTO CHRYSOTILE ASBESTOS FIBERS IN A SLURRY USING MAGNESIUM CHLORIDE AS SOLE PRECIPITATING AGENT
Chester Herbert Gelbert, Claymont, Del., assignor to E. I. du Pont de Nemours and Company, Wilmington, Del., a corporation of Delaware
No Drawing. Filed Oct. 17, 1961, Ser. No. 145,739
3 Claims. (Cl. 162—155)

This invention is directed to an improved process for preparing asbestos sheets containing a chloroprene polymer as the elastomeric binder. This improved and novel process utilizes magnesium chloride as the precipitating agent to cause the deposition of the chloroprene polymer upon the asbestos fibers.

Asbestos sheets, when formed in the absence of a binder, are weak and brittle and do not possess the necessary mechanical strength. It is therefore customary to add a binding agent to asbestos fibers. When a chloroprene polymer is used as the binding agent for asbestos fibers, the resulting asbestos sheets have high strength and excellent resistance to swelling in water and oil. The chloroprene polymer itself has excellent heat resistance and flame retarding properties.

The chloroprene polymer is usually added to the slurry of the asbestos fibers as a diluted latex, and the polymer is precipitated upon the asbestos fibers. When small amounts of the chloroprene polymer are added to the asbestos slurry, the latex will exhaust due to the difference in charge of the polymer and asbestos fibers without the addition of a precipitating agent. However, from a practical standpoint, it is desirable to accelerate the deposition of the polymer by the addition of a precipitating agent. The water is then allowed to drain, and the fibers are formed into sheets by conventional methods. Heretofore, hydrated aluminum sulfate

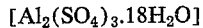
$$[Al_2(SO_4)_3 \cdot 18H_2O]$$

commonly called alum or papermaker's alum, has been suggested as the precipitating agent. However, when alum is used, the drainage time of the latex-treated asbestos slurry is excessively long. Particularly when forming thick webs, it is difficult to remove enough of the water to yield an asbestos sheet having satisfactory properties.

It is, therefore, an object of this invention to provide an improved method for the precipitation of a chloroprene polymer onto asbestos fibers; and, more specifically, such a process wherein magnesium chloride is added as the precipitating agent.

These and other objects will become apparent in the following description and claims.

More specifically, the present invention is directed to the preparation of an asbestos sheet wherein a latex of a chloroprene polymer is added to an aqueous slurry of chrysotile asbestos fibers, the solid chloroprene polymer in the latex being precipitated onto the asbestos fibers, and the resulting slurry of fibers thereafter formed into a sheet, the improvement which comprises adding a polychloroprene latex to the slurry of asbestos and effecting the precipitation of said chloroprene polymer onto the asbestos fibers by the presence of magnesium chloride in said aqueous slurry.

The term chloroprene used in this specification signifies the compound 2-chloro-1,3-butadiene. The latices to be used in the practice of this invention are the conventional latices of polymers of chloroprene. These are prepared by polymerization of chloroprene in aqueous emulsion by well known techniques which are disclosed in numerous references. See, for example, Whitby, "Synthetic Rubber," 1954, pages 767–793, and the following U.S. Patents: 2,264,173; 2,417,034; 2,426,854; 2,463,225; 2,467,769; 2,494,087; 2,567,117; 2,576,009. The solids content of the polychloroprene latices usually ranges from about 30 percent to about 60 percent. It is to be understood that the term "chloroprene polymer" is intended to include both homopolymers of chloroprene and copolymers of chloroprene in which the coplymer contains up to 60 percent by weight of the polymer, of units of another copolymerizable monomer containing the group $CH_2\!=\!C\!<$. Examples of suitable comonomers include: vinyl-substituted aromatic compounds such as styrene, vinyltoluenes, and vinylnaphthalenes; acrylic and methacrylic acid esters and nitriles, such as methyl methacrylate and acrylonitrile; and compounds containing two conjugated double bonds such as 1,3-butadiene, isoprene, and 2,3-dichloro-1,3-butadiene.

In practicing the process of this invention, any desired amount, up to 75 parts or even more of chloroprene polymer, by weight per 100 parts of asbestos, may be deposited on the asbestos fibers. The amounts of polymer to be deposited depends on the use to be made of the asbestos sheets. For example, in asbestos gaskets, the amount of polymer ranges from 15 to 35 parts.

The method used to bring the magnesium chloride, the latex, and the asbestos together may be varied considerably. The asbestos slurry and the polychloroprene latex may first be blended and the magnesium chloride may then be added to the mixture (Method A). Alternatively, the magnesium chloride may be added to the asbestos slurry before the addition of the latex (Method B). A third method (Method C) is a variation of Method B in which the magnesium chloride is added to the asbestos slurry and this slurry and the polychloroprene latex are mixed by a continuous process. These three methods will now be discussed in greater detail.

METHOD A

In using this method, an aqueous slurry of asbestos fibers is prepared by conventional methods. The asbestos content of the slurry (consistency) usually ranges from about 2 to 4 percent, depending on the mixing equipment to be used, the size of the asbestos fibers, the time cycle to be used, etc. The most important consideration is that the consistency be such as to permit adequate circulation of the asbestos fibers without settling or forming of stagnant areas. The selection of the proper consistency is within the scope of one skilled in the art.

The latex is then added to the asbestos slurry. The curing agent (usually zinc oxide) and an antioxidant are added to the latex as a ball-milled or colloid-milled dispersion in the conventional manner before the latex is added to the asbestos. The amount of curing agent and antioxidant added will depend on the end use of the sheets. Usually a minimum of 5 parts of zinc oxide and 2 parts of antioxidant, by weight per 100 parts of polymer, are added. Optionally other compounding ingredients may be added at this time. It is essential when using Method A to add a surface-active agent either to the latex or to the asbestos slurry or both to act as a stabilizer to prevent too rapid precipitation of the polymer when the latex comes in contact with the asbestos slurry. The preferred surface-active agents (hereinafter called stabilizers or stabilizing agents) are the sodium salts of condensation products of formaldehyde with naphthalenesulfonic acid or alkylated naphthalenesulfonic acids. Casein may be used although it is not the preferred agent. The amount of stabilizing agent depends on a number of variables, which include the amount of clotting desired, the degree and efficiency of agitation, etc. In a case where the degree of agitation prevents the development of a high concentration of coagulant at the point of contact of the asbestos and the latex, less stabilizing agent is needed to give the desired degree of clottiness. Where agitation is sluggish, more stabilizer is needed. In batch addition, such as in cases where the addition takes place in a tank, the agitation is somewhat sluggish and about 6 parts of stabilizer per 100 parts of dry polymer solids usually produces satisfactory stabilization. In general, the amount used ranges from about 2 parts to about 10 parts, by weight, per 100 parts of dry polymer solids.

The solids content of the latex is not critical. Where practical, the latex may be diluted with an equal weight of water to facilitate mixing, but this is not essential. The latex is then added to the asbestos slurry while agitating to prevent the build-up of high local concentrations of the latex.

After the latex is thoroughly distributed throughout the asbestos fibers, the magnesium chloride is then added as an aqueous solution in order to prevent formation of a high concentration at any one location. The concentration of the magnesium chloride solution is not critical, but it is preferred to use a concentration of 3 to 10 percent.

The total aomunt of magnesium chloride required also varies somewhat with the degree of clotting desired, the time cycle to be used, etc. In general, it has been found that at least 10 parts of magnesium chloride per 25 parts of polymer, both parts being based on dry weight, should be used to effect the precipitation within a reasonable time. If less than this amount is used, the precipitation will require too long a time for a practical process. More than this amount may be used if desired, but usually is not required. Mixing should be continued until the aqueous phase of the asbestos-latex dispersion becomes clear.

METHOD B

In Method B the asbestos slurry is prepared as in Method A. The desired amount of magnesium chloride is then added to the slurry, either as the solid or as an aqueous solution. As in Method A, it is preferred to use at least 10 parts of magnesium chloride per 25 parts of polymer solids both parts being by dry weight (that is, 40 parts per 100 parts of polymer).

The latex is then added to the asbestos slurry. The latex is compounded as described under Method A. However, it has been found that when adding the latex to the asbestos slurry containing the added magnesium chloride, the latex must be diluted to contain no more than 5 percent of polymer. Otherwise large agglomerates of the asbestos (clots) are formed which interfere with the formation of sheets. This effect may be offset to a certain extent by addition to the latex or the asbestos slurry of a stabilizing agent as described under Method A. However, when the latex is diluted to a solids content of 5 percent or less, no stabilizing agent is usually necessary.

METHOD C

Method C is a continuous method for mixing an asbestos slurry containing magnesium chloride with the compounded latex. In this method the concentration of asbestos in the slurry is limited only by the capacity of the pump. The amount of the magnesium chloride to be added will depend on the rate of mixing and the contact time of the asbestos slurry and the latex. In general, 20 to 40 parts of magnesium chloride per 100 parts of polymer solids is used. The magnesium chloride is added to the asbestos slurry as in Method B.

In Method C, as in Method B, the latex is diluted to a maximum of 5 percent solids content to prevent excessive clotting. Here again, the addition to the latex of a stabilizing agent will make it possible to use a latex of somewhat higher polymer content.

The asbestos slurry containing the magnesium chloride and the compounded diluted latex are pumped separately into a pipe under conditions which will produce intimate mixing of the two compositions. The rate of flow, the contact time of the two dispersions, and the amount of magnesium chloride present in the asbestos slurry are the principal variables which may be adjusted to ensure the complete precipitation within a reasonable time of the chloroprene polymer onto the asbestos fibers. The degree of clotting may also be controlled by varying the rate of flow and the magnesium chloride content of the asbestos slurry.

After the chloroprene polymer has been precipitated onto the asbestos fibers by one of the Methods A, B, or C, the suspension is transferred to a screen through which the water drains and it is then compacted into sheets by conventional means. It has been found that when magnesium chloride is used as the precipitant instead of alum, the drain time of the asbestos is much shorter than is the case when alum is used as the precipitant. This expedites the sheet making process.

Representative examples illustrating the present invention follow.

Example 1

This example illustrates the use of Method A described above. All parts are by weight.

A slurry of asbestos fibers is prepared using 20 parts of Canaadian chrysotile asbestos fibers (6D) and 980 parts of water. A 10 percent aqueous solution the sodium salt of the formaldehyde condensate of naphthalenesulfonic acid is added to the asbestos to give 1.75 parts of surface active agent per 100 parts of asbestos.

A polychloroprene latex is prepared as described in U.S. Patent 2,576,009, Example 1, except that the residual monomers are removed by the method described in U.S. Patent 2,467,769. The latex is compounded using the following recipe:

| | Parts |
|---|---|
| Polymer (dry basis) | 100 |
| Zinc oxide | 5 |
| 4,4'-thiobis(6-t-butyl-m-cresol) (antioxidant) | 3 |

The latex, containing 37.5 percent polymer, is added to the asbestos in an amount to give 25 parts of polymer per 100 parts of asbestos. Agitation is maintained during the addition of the latex and is maintained until the asbestos and latex are thoroughly blended.

After the asbestos slurry and the latex are thoroughly blended, 2 parts of magnesium chloride (anhydrous basis) are added as a 5 percent aqueous solution (10 parts of magnesium chloride per 100 parts of dry asbestos). The magnesium chloride solution is added, with agitation, over a period of 15 seconds and stirring is continued for 30 seconds after addition is complete. The pH of the mixture is about 9.

The entire mixture is then added to an 8″ x 8″ Noble and Wood headbox and is diluted with water to bring the total volume up to 8500 milliliters. The slurry is agitated mildly and a quick-acting valve is opened, releasing the water. The time required for the fibers to form a sheet on a 60-mesh screen is recorded as the drainage time. In this experiment it is 55 seconds. (8500 milliliters of water will pass through the screen in 6 seconds under these conditions.) The wet sheet is pressed and dried in the conventional manner.

When this experiment is repeated except that 10 parts of alum (anhydrous basis) per 100 parts of asbestos are added in place of magnesium chloride, the drainage time is 1200 seconds. The pH of the mixture after the addition of the alum is 4.5. The alum added is $$Al_2(SO_4)_3 \cdot 18H_2O$$

Example 2

This example illustrates the use of Method B.. All parts are by weight.

A slurry of asbestos fibers is prepared as described in Example 1 using Canadian chrysotile asbestos fibers (6D). After agitating the slurry for 15 seconds, 2 parts of magnesium chloride (anhydrous basis) are added as a 5 percent aqueous solution (10 parts of magnesium chloride per 100 parts of dry asbestos). A polychloroprene latex of the same type as used in Example 1 is compounded using the recipe of Example 1.

This compounded latex is diluted with water to a 1 percent polymer content and is added to the asbestos slurry in an amount to give 25 parts of polychloroprene solids per 100 parts of asbestos fibers. Agitation is maintained during addition and afterwards until the aqueous phase becomes clear and the slurry is smooth in appearance. The mixture is then treated as described in Example 1. The drain time is 28 seconds.

When this experiment is repeated except that alum is used instead of magnesium chloride, the slurry is too lumpy to be useable.

*Example 3*

This experiment is identical to Example 2 except that Type 5R asbestos is used, and the latex is diluted to a 5 percent polymer content. The drain time is 35 seconds. When alum is added instead of magnesium chloride the drain time of the slurry is 105 seconds.

*Example 4*

This example illustrates Method C described above. All parts are by weight.

In 15-gallon drums equipped with "Lightnin" agitators are prepared 2 percent aqueous slurries of Canadian chrysotile asbestos (6D). A series of six of these slurries is prepared containing, respectively, per 100 parts of asbestos, 10, 15, and 25 parts of magnesium chloride and 10, 15, and 25 parts of alum (both on an anhydrous basis).

In a separate container a compounded polychloroprene latex is prepared using the following recipe:

| | Parts |
|---|---|
| Polychloroprene of the same type as in Example 1 (dry basis) | 100 |
| Zinc oxide | 5 |
| 2,2′ - methylenebis(6-t-butyl-p-cresol) | 2 |
| Sodium lauryl sulfate | 0.5 |

The sodium lauryl sulfate is added to stabilize the latex against mechanical coagulation during the pumping process. The latex is diluted with water to give a 3 percent polymer content.

In this example the mixing chamber consists of a standard 1¼-inch steam trap Y strainer holder. The asbestos slurry is pumped into the wide arm (1¼-inch in diameter) at the rate of 8390 grams in 15 seconds. The diluted compounded latex is pumped through a rotameter into the narrow arm of the Y at a rate to give the desired amount of polymer. The arm into which the latex is pumped has been adapted as follows: A ¼-inch pipe is inserted, using appropriate bushings, into the ¾-inch opening. This pipe extends to the point just prior to the convergence of the two arms into a single pipe. This prevents the formation of stagnant areas in the wide area of the Y. The pipe after the joining of the two arms of the Y is 1-inch diameter and feeds into a variable-speed pump. In this example this third pump is used to insure adequate mixing. This pump is not necessary if the pumps transferring the latex and the asbestos slurry and the length and diameter of the pipe following the Y are sized to provide adequate mixing. The pumps transferring the asbestos slurry and the latex in this example have a top speed of 1710 r.p.m.

The drainage time of the latex-treated asbestos slurry is measured as described in Example 1.

Table I which follows shows the conditions used in the experiment to obtain an effluent composition in which the supernatant aqueous phase is clear, indicating that precipitation of the latex on the asbestos fibers is complete, and shows the drainage time observed. This table also shows the drainage time observed when the slurry containing 10 parts of alum is used instead of the slurry containing 10 parts of magnesium chloride.

TABLE I

| | A | B |
|---|---|---|
| Asbestos, parts | 100 | 100 |
| Magnesium chloride, parts | 10 | |
| Alum, parts | | 10 |
| Polymer, parts | 25 | 25 |
| Speed of variable-speed pump, r.p.m | 1,340 | 1,340 |
| Length of 1″ pipe between Y and pump inlet, inches | 2 | 2 |
| Drainage time, seconds | 15 | 240 |

To precipitate 50 parts of polymer onto 100 parts of asbestos, the asbestos slurry containing 15 parts of magnesium chloride per 100 parts of asbestos is used. To provide adequate mixing and contact time to precipitate all of the polymer, the speed of the variable-speed pump and the length of the pipe are increased. Table II shows the conditions used and the drainage time observed when magnesium chloride is used and when the magnesium chloride has been replaced with alum.

TABLE II

| | A | B |
|---|---|---|
| Asbestos, parts | 100 | 100 |
| Magnesium chloride, parts | 15 | |
| Alum, parts | | 15 |
| Polymer, parts | 50 | 50 |
| Speed of variable-speed pump, r.p.m | 1,410 | 1,410 |
| Length of 1-inch pipe between Y and pump inlet, inches | 23 | 23 |
| Drainage time, seconds | 20 | 100 |

Table III shows the data from a similar experiment in which 75 parts of polymer are precipitated on 100 parts of asbestos fibers. In this case the asbestos slurry containing 25 parts of magnesium chloride per 100 parts of asbestos is used. For comparison a similar experiment is run using the asbestos slurry containing 25 parts of alum. When alum is used, the latex-treated slurry is so bulky that the flow is greatly reduced, thereby limiting the capacity of the asbestos slurry pump and the latex feed pump. With this particular equipment in this experiment, a maximum of only 67 parts of polymer can be added per 100 parts of asbestos.

TABLE III

| | A | B |
|---|---|---|
| Asbestos, parts | 100 | 100 |
| Magnesium chloride, parts | 25 | |
| Alum, parts | | 25 |
| Polymer, parts | 75 | 67 |
| Speed of variable-speed pump, r.p.m | 1,710 | 1,710 |
| Length of 1-inch pipe between Y and pump inlet, inches | 23 | 23 |
| Drainage time, seconds | 40 | 130 |

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In a process for preparing an asbestos sheet which comprises (1) adding a chloroprene polymer latex to an aqueous slurry of chrysotile asbestos fibers, (2)

precipitating the solid chloroprene polymer in said latex onto the asbestos fibers, (3) draining the water therefrom and (4) forming the resulting fibers into a sheet; the improvement of reducing the time of said draining by adding as sole precipitating agent from about 20 to 40 parts of magnesium chloride per 100 parts of polymer solids to said asbestos slurry in step (2) above.

2. A process improvement as defined in claim 1 wherein said magnesium chloride is added to said asbestos slurry before said latex is added thereto, and wherein said latex contains no more than 5% of said polymer.

3. In a continuous process for preparing an asbestos sheet which comprises (1) continuously blending and mixing a latex containing no more than 5% of a chloroprene polymer with an aqueous slurry of chrysotile asbestos fibers, (2) precipitating the solid chloroprene polymer in said latex onto the asbestos fibers, (3) draining the water therefrom and (4) forming the resulting fibers into a sheet; the improvement of reducing the time of said draining by adding as sole precipitating agent from about 20 to 40 parts of magnesium chloride per 100 parts of polymer solids to said asbestos slurry before said slurry is blended with said latex.

References Cited in the file of this patent

UNITED STATES PATENTS

| | | |
|---|---|---|
| 1,907,617 | Tucker | May 9, 1933 |
| 1,993,277 | Murphy et al. | Mar. 5, 1935 |
| 2,375,245 | Pretzel | May 8, 1945 |
| 2,661,287 | Barbara | Dec. 1, 1953 |
| 2,686,121 | Latham et al. | Aug. 10, 1954 |
| 2,767,090 | Dunlap | Oct. 16, 1956 |
| 2,868,641 | Feigley | Jan. 13, 1959 |
| 2,940,893 | Feigley et al. | June 14, 1960 |
| 2,971,879 | Piersol | Feb. 14, 1961 |

FOREIGN PATENTS

| | | |
|---|---|---|
| 375,845 | Great Britain | June 30, 1932 |